Aug. 28, 1923.

H. FOLLAND ET AL 1,466,524

BALANCING CARRIAGE FOR CONVEYING HEAVY GOODS

Filed Aug. 28, 1922

Inventors:
Henry Folland &
John Oliver Powell
Per: Raynor
Attorneys.

Patented Aug. 28, 1923.

1,466,524

UNITED STATES PATENT OFFICE.

HENRY FOLLAND, OF BLACKPILL, NEAR SWANSEA, AND JOHN OLIVER POWELL, OF GORSEINON, WALES.

BALANCING CARRIAGE FOR CONVEYING HEAVY GOODS.

Application filed August 28, 1922. Serial No. 584,767.

*To all whom it may concern:*

Be it known that we, HENRY FOLLAND and JOHN OLIVER POWELL, subjects of the King of Great Britain and Ireland, and residents of, respectively, Llwynderw, Blackpill, Near Swansea, Glamorgan, Wales, and 1, Argyll Avenue, Gorseinon, Glamorgan, Wales, have invented new and useful Improvements in Balancing Carriages for Conveying Heavy Goods, of which the following is a specification.

Our invention relates to appliances for use in the manipulation and transportation of heavy goods and is especially useful for conveying annealing pots employed in the annealing of plates or sheets of iron or steel, and the appliances are of the kind in which a carriage of girder-like construction is supported towards its centre, one end having means for supporting the goods to be conveyed whilst the other is provided with a movable counterbalance weight.

The object of our invention consists in a construction in which when the carriage is raised with or without the load, the same is automatically counterbalanced and in which heavy manual labour is rendered unnecessary whilst enabling the loads to be handled with the minimum mechanical power.

According to the invention, the carriage or the like is supported in the neighbourhood of the centre of its length upon a pair of wheels, and the end on which the load is supported rests upon the ground. The opposite end of the carriage has movably mounted thereon a counterbalance weight which is so supported that it is able to travel along the carriage towards the centre thereof under its own weight at appropriate times.

The carriage is provided in the neighbourhood of its centre with a suspension shaft around a wheel or drum or its equivalent on which passes one or more turns of a rope, chain, cable or other flexible member by means of which the carriage is hoisted. The chain or the like is fixed at one end to the wheel or drum and after passing round the latter to the extent of one or more turns it is attached to the hook of an overhead crane or the like.

The suspension shaft is geared in any suitable manner to the moving counterweight so that the preliminary raising movement of the cable or its equivalent will act to move the counterweight to such a position on the carriage that the load will be automatically counterbalanced. Preferably the arrangement comprises a pivotal lever mounted towards the load end of the carriage which, when this end of the carriage leaves the ground operates a pawl co-operating with a ratchet wheel associated preferably with the suspension shaft to lock the said shaft and consequently the counterbalance weight in the "counterbalancing" position on said carriage. The ratchet wheel may however be mounted on a lay shaft. Means may be provided for manually operating the ratchet and pawl mechanism. For instance the pivotal lever at the load end of the carriage may be connected by a rod or the like to an operating lever at the opposite end.

The carriage is preferably provided at the end opposite to that which supports the load with a wheel or pair of wheels or the like serving to limit the turning movement of the girder about its point of suspension.

In order that the invention may be readily understood, reference is made to the accompanying drawings which show, by way of example, the preferred construction according to the invention.

Figure 2:
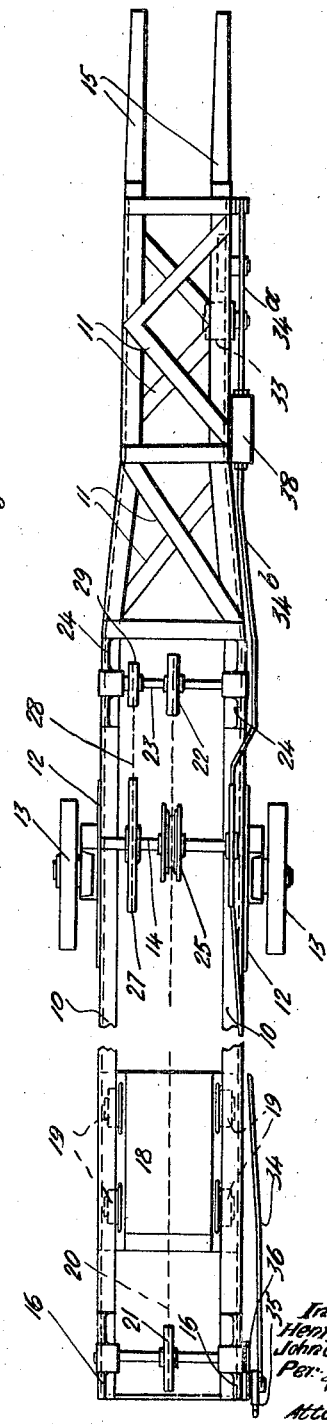
Figure 2 is a plan view of Figure 1.

The apparatus comprises a carriage built up of two parallel beams or girders 10, 10, spaced apart as shown in Figure 2 and connected together in any suitable manner at one or both ends as shown for example at 11 by diagonal cross bracing. At or near the centre of the carriage is fixed a framework 12 the lower portion of which supports a pair of wheels 13 on which the apparatus rests when on the ground. This framework also serves to support a suspension shaft 14 hereafter referred to.

The lower end of the carriage is provided with a fixed platform or the like 15 on which the load is adapted to be supported, whilst its opposite end is provided with depending brackets 16 which support wheels or rollers 17 serving to limit the movement of the carriage about the point of suspension.

18 is a counterbalance weight provided with wheels or rollers 19 which are adapted to run along the inner side of the beams 10, 10 as shown in Figure 2. The counterbalance weight 18 is attached to an endless chain or cable 20 which runs over a wheel or grooved pulley 21 at the upper end of the carriage and over a second grooved pulley or the like 22 mounted on a shaft 23 supported in brackets 24 adjacent the framework 12. The counterbalance weight is so mounted however that it is able to move under its own weight towards the centre of the carriage when the same is inclined.

The suspension shaft 14 which is supported by the framework 12 carries a wheel or drum 25 preferably located centrally of the carriage, and 26 is a chain or cable one end of which is fixed to the wheel or drum and after passing round said wheel to the extent of one or more turns passes upwardly and is attached to the hook of an overhead crane (not shown). By this means when the hoisting gear is set in motion, the pull on the chain or the like 26 first causes the suspension shaft to rotate before the carriage is actually raised from the ground. The suspension shaft 14 has keyed thereto a grooved pulley or chain wheel 27 over which passes a chain or the like 28. The chain or the like also passes over a grooved pulley or chain wheel 29 keyed to the shaft 23.

Figure 1:
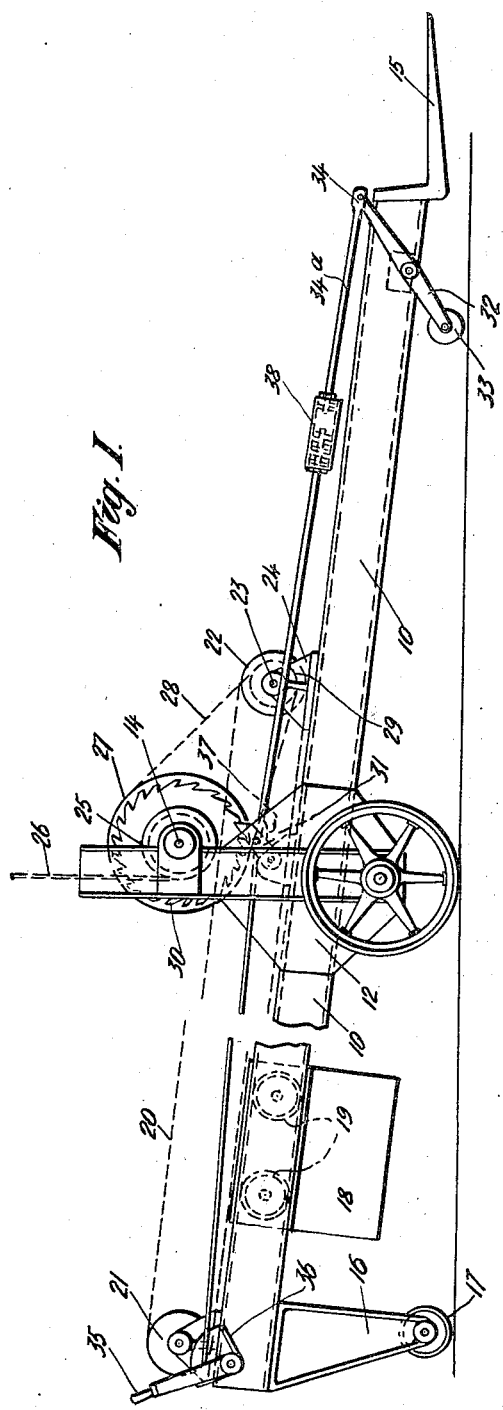
Figure 1 is a side view of the apparatus showing the same in the position in which the carriage is just about to be hoisted.

One side of the drum or wheel 25 carries a ratchet wheel 30 with which co-operates a pawl 31 by means of which the rotation of the suspension shaft 14 is controlled. Towards the load end of the carriage is mounted a pivotal two armed lever 32, the lower end of which carries a wheel or roller 33, whilst the opposite end of said lever is pivotally connected to a rod 34 which extends to the opposite end of the carriage and is attached to a pivotal operating lever 35 mounted on a bracket 36 in the form of a quadrant. The rod 34 is connected at 37 to the pawl 31 and is provided in the course of its length with a swivelling yoke member 38 rotatably connected to the portion 34ᵃ of the rod 34 and is resiliently connected to the portion 34ᵇ, so that the pawl 31 may be moved to its engaging position even when the lever 32 is in the position shown in Figure 1.

When the load is in position on the platform 15, and the latter is resting upon the ground, the carriage is supported towards its centre by the wheels 13, whilst the wheels or rollers 17 are raised from the ground, the counter-balance weight having moved along the carriage towards the centre thereof. If now the hoisting gear be set in operation, the preliminary pull on the cable or its equivalent 26 rotates the suspension shaft 14 in a clockwise direction (Figure 1), the pawl 31 being held out of engagement with the ratchet wheel 30 owing to the fact that the pivotal lever 32 is rocked in a clockwise direction about its pivot by contact of the roller thereon with the ground on which the load end of the carriage rests. The clockwise rotation of the suspension shaft 14 drives the shaft 23 through the chain 28. The rotation thus given to the shaft 23 causes the counterbalance weight to move from the centre of the carriage towards the upper end, and said weight continues to move in this direction until it reaches a point at which the load on the lower end of the carriage is counterbalanced. As soon as this counterbalancing takes place the lower or load end of the carriage rises from the ground and the rocking of the pivotal lever 32 moves the pawl 31 into engagement with the ratchet wheel 30 whereby further rotation of the suspension shaft 14 and the shaft 23 which drives the endless chain 20 is stopped. The continued operation of the hoisting gear now raises the carriage bodily and the latter will be effectively counterbalanced, the crane or other tackle being operated to move or transmit the load to the required position.

When the carriage is again lowered by the hoisting and lowering gear the wheels 13 first come into contact with the ground and then the wheel or rollers 17, and finally the load end of the carriage is gradually lowered to the ground thereby rocking the pivotal lever 32 and disengaging the pawl 31 from the ratchet wheel 30. The cable or the like of the hoisting gear is paid out for a short length thereof and during this paying out the counterbalance weight moves under its own weight along the inclined carriage towards the centre thereof.

The apparatus may be applied in a similar manner to jib cranes or the like machines.

It will be understood that the details of construction and arrangement of parts may be modified without departing from the principle of the invention as set forth in the appended claims.

We claim:—

1. An automatic balancing carriage for the transportation or conveyance of heavy goods, comprising a carriage supported on wheels in the neighbourhood of its centre, means for supporting the load at one end of the carriage, means for supporting the opposite end in a position above the ground surface, a movable counterbalance weight mounted on the raised end of the carriage, a suspension member rotatably mounted on said carriage, a flexible hauling member wound on and attached to said suspension member, means between said suspension member and said movable weight for locating the latter to counterbalance the load, and means for automatically locking said weight in the counterbalancing position, for the purposes set forth.

2. An automatic balancing carriage, comprising a longitudinal carriage supported in the neighbourhood of its centre on wheels, means for supporting a load at one end of said carriage, means for supporting the opposite end in a raised position, a movable weight slidably mounted on said carriage and adapted to move towards the centre thereof under its own weight, a suspension member rotatably mounted on said carriage, a flexible hauling member passing round and attached to said suspension member, means between said suspension member and the movable weight for moving the latter from the centre towards one end of the carriage, and means operated by the movement of the loaded end of the carriage for retaining the movable weight in the counterbalancing position when the hauling member is operated, for the purposes set forth.

3. An automatically balancing, transporting and conveying carriage for heavy goods, comprising a longitudinal carriage, a pair of wheels supporting said carriage towards its centre, a load carrying platform at one end of said carriage, means for supporting the opposite end of the carriage in a raised position, a counterbalancing weight mounted to move in guides longitudinally of the carriage, a suspension member consisting of a rotatable drum mounted towards the centre of said carriage, a cable wound round and attached to said drum, an endless flexible member attached to said weight, supporting means for said flexible member adapted to permit movement thereof in a longitudinal plane with respect to said carriage, means associated with said suspension member for moving said weight towards the raised end of said carriage when the cable is tensioned, and means for arresting the movement of said weight when it reaches the counterbalancing position.

4. An automatically balancing transporting and conveying carriage for heavy goods, comprising a longitudinal carriage, a load carrying platform at one end of said carriage, a movable weight mounted on guides towards the opposite end of said carriage, a hauling member attached to said carriage in the neighbourhood of its centre, and means operated by the pull on the hauling member for automatically moving the weight to the counerbalancing position before said carriage with its load is raised from the ground, for the purposes set forth.

5. An automatically balancing, transporting and conveying carriage for heavy goods, comprising a longitudinal carriage, a load carrying platform at one end of said carriage, a movable weight mounted on guides towards the opposite end of said carriage, a hauling member attached to said carriage in the neighbourhood of its centre, means operated by the preliminary pull on the hauling member for moving the weight to a position to counterbalance the load, and means operated by the rising of the load carrying end of the carriage for retaining said wieght in the counterbalancing position.

6. An automatically balancing, transporting and conveying carriage for heavy goods, comprising a longitudinal carriage, a load carrying platform at one end of said carriage, a movable weight mounted on guides towards the opposite end of said carriage, a hauling member attached to said carriage in the neighbourhood of its centre, means operated by the preliminary pull on the hauling member for moving the weight to a position to counterbalance the load, and a rocking member mounted at the load end of the carriage adapted to be rocked by the rising of the load end of said carriage from the ground to operate retaining means for locking the weight in the counterbalancing position, for the pusposes set forth.

7. An automatically balancing, transporting and conveying carriage for heavy goods, comprising a longitudinal carriage provided with a wheeled support towards its centre, a load carrying platform at one end of said carriage, means at the opposite end of said carriage for supporting said end in the raised position, a movable weight mounted on guides towards the raised end of said carriage, a rotatable supporting member attached to said carriage, a hauling member passing round and attached to said supporting member, means connected to said rotatable supporting member for moving the weight towards the raised end of the carriage when said member is rotated, and a locking member adapted to be brought into operation to arrest the rotation of said supporting member when the counterbalance weight reaches a position to raise the load end of the carriage off the ground, for the purposes set forth.

8. An automatically balancing, transporting and conveying carriage for heavy goods, comprising a longitudinal carriage, supporting wheels towards the centre of said carriage adapted to support the carriage in an inclined position when resting upon the ground, a load carrying platform at the lower end of said carriage, a movable weight mounted on guides towards the opposite end of said carriage, a suspension shaft mounted on said carriage, a drum on said shaft, a cable wound round and attached to said drum, an endless band attached to said weight, rotatable supporting wheels for said band, means operated by the rotation of said suspension shaft for causing the weight to be moved through the endless band towards the raised end of said carriage and locking means for retaining said suspension shaft against rotation when the weight reaches a position to counterbalance the load, for the purposes set forth.

9. An automatically balancing, transporting and conveying carriage for heavy goods, comprising a longitudinal carriage, supporting wheels towards the centre of said carriage adapted to support the carriage in an inclined position when resting upon the ground, a load carrying platform at the lower end of said carriage, a movable weight mounted on guides towards the opposite end of said carriage, a suspension shaft mounted on said carriage, a drum on said shaft, a cable wound round and attached to said drum, an endless band attached to said weight, rotatable supporting wheels for said band, means operated by the rotation of said suspension shaft for causing the weight to be moved through the endless band towards the raised end of said carriage, a ratchet wheel mounted on said suspension shaft, a pawl co-operating with said ratchet wheel, and a pivotal lever mounted towards the load end of said carriage adapted, when said load end is raised from the ground to be rocked to operate the pawl and secure the suspension shaft against further rotation.

10. An automatically balancing, transporting and conveying carriage for heavy goods, comprising a longitudinal carriage, supporting wheels towards the centre of said carriage adapted to support the carriage in an inclined position when resting upon the ground, a load carrying platform at the lower end of said carriage, a movable weight mounted on guides towards the opposite end of said carriage, a suspension shaft mounted on said carriage, a drum on said shaft, a cable wound round and attached to said drum, an endless band attached to said weight, rotatable supporting wheels for said band, means operated by the rotation of said suspension shaft for causing the weight to be moved through the endless band towards the raised end of said carriage, a ratchet wheel on said suspension shaft, a pawl co-operating with said ratchet wheel, a pivotal two-armed lever mounted toward the load end of said carriage, a connecting rod attached to said pawl at one end and to one arm of said lever at the opposite end, and a wheel on the opposite arm of said two armed lever contacting with the ground, the arrangement being such that the two armed lever is rocked when the load end of the carriage rises from the ground and moves said pawl into engagement with said ratchet wheel to prevent further rotation of the suspension shaft, for the purposes set forth.

11. An automatically balancing, transporting and conveying carriage for heavy goods, comprising a longitudinal carriage, supporting wheels towards the centre of said carriage adapted to support the carriage in an inclined position when resting upon the ground, a load carrying platform at the lower end of said carriage, a movable weight mounted on guides towards the opposite end of said carriage, a suspension shaft mounted on said carriage, a drum on said shaft, a cable wound round and attached to said drum, an endless band attached to said weight, rotatable supporting wheels for said band, means operated by the rotation of said suspension shaft for causing the weight to be moved through the endless band towards the raised end of said carriage,—locking means for retaining said suspension shaft against rotation when the weight reaches a position to counterbalance the load, and means for manually disengaging said locking means, for the purposes set forth.

12. A balancing carriage for the transportation and conveyance of heavy goods, comprising a longitudinal carriage, means at one end of said carriage for supporting the same in a raised position, a load carrying platform at the lower end of said carriage, pulleys at the raised end and in the neighbourhood of the centre of said carriage, an endless band passing over said pulleys, a weight slidably mounted in guides on said carriage and attached to said endless band, a suspension shaft mounted towards the centre of said carriage, a hauling cable wound round and attached to said shaft, driving means between said suspension shaft and one of said pulleys, locking means for securing said suspension shaft against rotation when the weight has been moved by the rotation of the suspension shaft to a position to counterbalance the load, and a movable member at the load end of the carriage adapted to operate said locking means when the weight reaches a position to counterbalance the load for the purposes set forth.

HENRY FOLLAND.
JOHN OLIVER POWELL.